(12) United States Patent
Bruck et al.

(10) Patent No.: US 10,782,479 B2
(45) Date of Patent: *Sep. 22, 2020

(54) METHOD AND SYSTEM FOR MODE CONVERTERS FOR GRATING COUPLERS

(71) Applicant: Luxtera, Inc., Carlsbad, CA (US)

(72) Inventors: Roman Bruck, Carlsbad, CA (US); Attila Mekis, Carlsbad, CA (US)

(73) Assignee: LUXTERA LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/945,370

(22) Filed: Apr. 4, 2018

(65) Prior Publication Data
US 2018/0306977 A1 Oct. 25, 2018
US 2019/0250334 A9 Aug. 15, 2019

Related U.S. Application Data

(63) Continuation-in-part of application No. 15/433,668, filed on Feb. 15, 2017, now Pat. No. 9,946,024, which
(Continued)

(51) Int. Cl.
*H04J 14/02* (2006.01)
*G02B 6/293* (2006.01)
(Continued)

(52) U.S. Cl.
CPC ............ *G02B 6/2938* (2013.01); *G02B 6/14* (2013.01); *G02B 6/29305* (2013.01); *G02B 6/34* (2013.01);
(Continued)

(58) Field of Classification Search
CPC .... H04B 10/2581; H04B 10/25; H04B 10/50; H04B 10/506; H04B 10/40; H04B 10/801;
(Continued)

(56) References Cited

U.S. PATENT DOCUMENTS

| 4,772,861 A | 9/1988 | Young |
| 5,138,667 A | 8/1992 | Roch et al. |
| (Continued) | | |

FOREIGN PATENT DOCUMENTS

| WO | 2004021056 A1 | 3/2004 |
| WO | WO2004021056 | 3/2004 |

OTHER PUBLICATIONS

Notification of Transmittal of The International Search Report and The Written Opinion of the International Searching Authority, or The Declaration.
(Continued)

*Primary Examiner* — Hibret A Woldekidan
(74) *Attorney, Agent, or Firm* — Patterson + Sheridan, LLP

(57) ABSTRACT

Methods and systems for mode converters for grating couplers may include a photonic chip comprising a waveguide, a grating coupler, and a mode converter, with the waveguide being coupled to the grating coupler via the mode converter. The mode converter may include waveguide material and tapers defined by tapered regions, where the tapered regions do not have waveguide material. The photonic chip may receive an optical signal in the mode converter from the waveguide, where the received optical signal has a light profile that may be spatially deflected in the mode converter to configure a desired profile in the grating coupler. A long axis of the tapers may be parallel to a direction of travel of the optical signal. The long axis of the tapers may point towards the input waveguide of the grating couplers, which may be linear.

19 Claims, 8 Drawing Sheets

Related U.S. Application Data is a continuation of application No. 15/232,051, filed on Aug. 9, 2016, now Pat. No. 9,575,253, which is a continuation of application No. 14/811,199, filed on Jul. 28, 2015, now Pat. No. 9,417,410, which is a continuation of application No. 13/936,408, filed on Jul. 8, 2013, now Pat. No. 9,091,827.

(60) Provisional application No. 62/487,155, filed on Apr. 16, 2017.

(51) Int. Cl.
| | |
|---|---|
| H04B 10/2581 | (2013.01) |
| H04J 14/00 | (2006.01) |
| G02B 6/34 | (2006.01) |
| G02B 6/14 | (2006.01) |
| H04B 10/80 | (2013.01) |
| G02B 6/27 | (2006.01) |
| G02B 6/12 | (2006.01) |

(52) U.S. Cl.
CPC ....... H04B 10/2581 (2013.01); H04B 10/801 (2013.01); H04J 14/00 (2013.01); *G02B 6/2773* (2013.01); *G02B 2006/12107* (2013.01)

(58) Field of Classification Search
CPC .......... G02B 6/34; G02B 6/2938; G02B 6/14; G02B 6/29305; G02B 6/2773; G02B 6/12019; G02B 6/125; G02B 6/305; G02B 2006/12107; G02B 2006/12061; G02B 2006/12152; G02B 6/1228; G02B 6/124; G02B 6/26; G02B 6/30; G02B 5/1861; G02B 2006/12195; H04J 14/00; H04J 14/04; H04J 14/02; H01S 5/1014; H01S 5/22
USPC ..... 398/141, 142, 143, 144, 182, 87, 83, 84; 385/43, 37
See application file for complete search history.

(56) References Cited

U.S. PATENT DOCUMENTS

| | | | |
|---|---|---|---|
| 5,138,687 A | 8/1992 | Horie et al. | |
| 6,293,688 B1 | 9/2001 | Deacon | |
| 6,888,414 B2 | 5/2005 | Albean | |
| 6,944,192 B2 | 9/2005 | Prassas et al. | |
| 7,065,274 B2 | 6/2006 | Miller | |
| 7,136,544 B1 | 11/2006 | Gunn | |
| 7,260,293 B1 | 8/2007 | Gunn et al. | |
| 7,269,358 B2 * | 9/2007 | Hallemeier | G02B 6/14 398/143 |
| 7,283,706 B2 | 10/2007 | Kim et al. | |
| 7,298,945 B2 | 11/2007 | Gunn et al. | |
| 7,366,421 B2 * | 4/2008 | Cho | G02B 6/14 398/142 |
| 7,397,987 B2 | 7/2008 | Witzens et al. | |
| 7,881,575 B2 * | 2/2011 | Mekis | G02B 6/14 385/28 |
| 8,515,220 B1 | 8/2013 | Khitrov et al. | |
| 8,873,899 B2 * | 10/2014 | Anderson | G02B 6/27 385/11 |
| 9,091,827 B2 | 7/2015 | Verslegers et al. | |
| 9,122,006 B1 * | 9/2015 | Roth | G02B 6/126 |
| 9,256,028 B2 * | 2/2016 | Li | G02B 6/12011 |
| 9,315,788 B2 | 4/2016 | Duchateau et al. | |
| 9,360,621 B1 | 6/2016 | Park et al. | |
| 9,417,410 B2 | 8/2016 | Verslegers et al. | |
| 9,575,253 B2 | 2/2017 | Verslegers et al. | |
| 9,885,832 B2 | 2/2018 | Lambert et al. | |
| 9,912,408 B2 * | 3/2018 | Mekis | H04J 14/02 |
| 9,946,024 B2 | 4/2018 | Verslegers et al. | |
| 10,168,481 B2 | 1/2019 | Verslegers et al. | |
| 10,436,990 B2 * | 10/2019 | Bruck | H04B 10/2504 |
| 10,509,170 B2 | 12/2019 | Verslegers et al. | |
| 2001/0028769 A1 | 10/2001 | Deacon | |
| 2004/0156590 A1 * | 8/2004 | Gunn, III | G02B 6/1228 385/37 |
| 2004/0202440 A1 * | 10/2004 | Gothoskar | G02B 6/1228 385/129 |
| 2004/0208447 A1 | 10/2004 | Ramadan | |
| 2004/0258360 A1 * | 12/2004 | Lim | B82Y 20/00 385/43 |
| 2006/0177178 A1 | 8/2006 | Greiner et al. | |
| 2009/0196547 A1 | 8/2009 | Mekis | |
| 2009/0245728 A1 | 10/2009 | Cherchi et al. | |
| 2009/0290837 A1 * | 11/2009 | Chen | G02B 6/34 385/37 |
| 2010/0006784 A1 | 1/2010 | Mack | |
| 2010/0119229 A1 | 5/2010 | Roelkens et al. | |
| 2010/0265504 A1 * | 10/2010 | Kopp | G02B 6/12002 356/364 |
| 2012/0194911 A1 | 8/2012 | Li et al. | |
| 2012/0281950 A1 | 11/2012 | Fattal et al. | |
| 2013/0108212 A1 | 5/2013 | Peng et al. | |
| 2013/0209112 A1 | 8/2013 | Witzens | |
| 2013/0236193 A1 | 9/2013 | Sengupta | |
| 2013/0294724 A1 | 11/2013 | Li | |
| 2013/0294727 A1 | 11/2013 | Ko | |
| 2014/0010498 A1 * | 1/2014 | Verslegers | G02B 6/124 385/37 |
| 2014/0029894 A1 | 1/2014 | Bowen | |
| 2014/0286648 A1 * | 9/2014 | Buelow | G02B 6/2808 398/143 |
| 2018/0306977 A1 | 10/2018 | Bruck et al. | |
| 2019/0170942 A1 * | 6/2019 | Bruck | H04B 10/2581 |

OTHER PUBLICATIONS

Notification Concerning Transmittal of International Preliminary Report on Patentability (Chapter 1 of The Patent Cooperation Treaty), dated Oct. 31, 2019, for Application No. PCT/US2018/028424.
European Examination Report for Application No. 18 157 074.8-1103 dated Dec. 18, 2019.
European Patent Office, Communication with extended European search report, in Application No. 13175823.8, dated Oct. 28, 2013.
European Patent Office, Communication with Euroopean Search Report, in Application No. 18157074.8, dated Jun. 25, 2018.
U.S. Appl. No. 16/789,731 "Method and System for Mode Converters for Grating Couplers Incorporating Perturbed Waveguides," , filed Jan. 20, 2020.

* cited by examiner

METHOD AND SYSTEM FOR MODE CONVERTERS FOR GRATING COUPLERS

CROSS-REFERENCE TO RELATED APPLICATIONS/INCORPORATION BY REFERENCE

This application is a continuation-in-part of application Ser. No. 15/433,668 filed on Feb. 15, 2017, which is a continuation of application Ser. No. 15/232,051 filed on Aug. 9, 2016, now U.S. Pat. No. 9,575,253, which is a continuation of application Ser. No. 14/811,199 filed on Jul. 28, 2015, now U.S. Pat. No. 9,417,410, which is a continuation of application Ser. No. 13/936,408 filed on Jul. 8, 2013, now U.S. Pat. No. 9,091,827. The present application also claims priority to and the benefit of U.S. Provisional Application 62/487,155 filed on Apr. 19, 2017, which is hereby incorporated herein by reference in its entirety.

FIELD

Aspects of the present disclosure relate to electronic components. More specifically, certain implementations of the present disclosure relate to methods and systems for mode converters for grating couplers.

BACKGROUND

Conventional approaches for optical grating couplers may be costly, cumbersome, and/or inefficient—e.g., they may be complex and/or time consuming, and/or may introduce asymmetry.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for mode converters for grating couplers, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

Figure 1A:
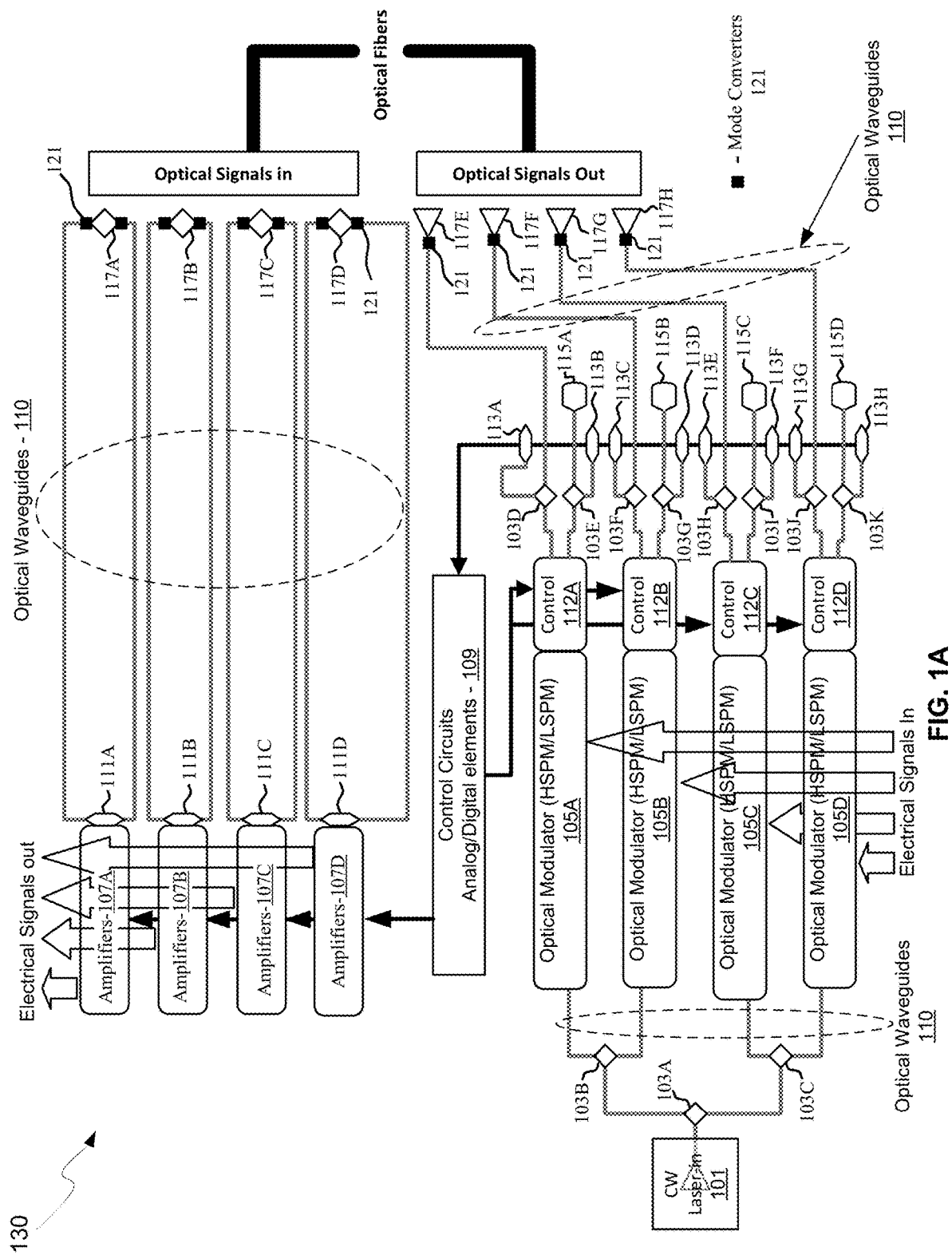
FIG. 1A is a block diagram of a photonically-enabled integrated circuit with mode converters for grating couplers, in accordance with an example embodiment of the disclosure.

FIG. 1A is a block diagram of a photonically-enabled integrated circuit with mode converters for grating couplers, in accordance with an example embodiment of the disclosure. Referring to FIG. 1A, there is shown optoelectronic devices on a photonically-enabled integrated circuit 130 comprising optical modulators 105A-105D, photodiodes 111A-111D, monitor photodiodes 113A-113H, and optical devices comprising couplers 103A-103K, optical terminations 115A-115D, grating couplers 117A-117H, and mode converters 121. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example.

In an example scenario, the photonically-enabled integrated circuit 130 comprises a CMOS photonics die with a laser assembly 101 coupled to the top surface of the IC 130. The laser assembly 101 may comprise one or more semiconductor lasers with isolators, lenses, and/or rotators for directing one or more CW optical signals to the coupler 103A. The photonically enabled integrated circuit 130 may comprise a single chip, or may be integrated on a plurality of die, such as one or more electronics die and one or more photonics die.

Optical signals are communicated between optical and optoelectronic devices via optical waveguides 110 fabricated in the photonically-enabled integrated circuit 130. Single-mode or multi-mode waveguides may be used in photonic integrated circuits. Single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode whose polarization is TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab. Of course, other waveguide cross section types are also contemplated and are within the scope of the disclosure.

In an example scenario, the couplers 103A-103C may comprise low-loss Y-junction power splitters where coupler 103A receives an optical signal from the laser assembly 101 and splits the signal to two branches that direct the optical signals to the couplers 103B and 103C, which split the optical signal once more, resulting in four roughly equal power optical signals.

The optical modulators 105A-105D comprise Mach-Zehnder or ring modulators, for example, and enable the modulation of the continuous-wave (CW) laser input signal. The optical modulators 105A-105D may comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress. Compensating for these slowly varying phase factors is referred to as the passive phase, or the passive biasing of the Mach-Zehnder Modulator (MZM).

The outputs of the optical modulators 105A-105D may be optically coupled via the waveguides 110 to the grating couplers 117E-117H. The couplers 103D-103K may comprise four-port optical couplers, for example, and may be utilized to sample or split the optical signals generated by the optical modulators 105A-105D, with the sampled signals being measured by the monitor photodiodes 113A-113H. The unused branches of the directional couplers 103D-103K may be terminated by optical terminations 115A-115D to avoid back reflections of unwanted signals.

The grating couplers 117A-117H comprise optical gratings that enable coupling of light into and out of the photonically-enabled integrated circuit 130. The grating couplers 117A-117D may be utilized to couple light received from optical fibers into the photonically-enabled integrated circuit 130, and the grating couplers 117E-117H may be utilized to couple light from the photonically-enabled integrated circuit 130 into optical fibers. The grating couplers 117A-117H may comprise single polarization grating couplers (SPGC) and/or polarization splitting grating couplers (PSGC). In instances where a PSGC is utilized, two input, or output, waveguides may be utilized.

Grating couplers are devices in integrated optical circuits that interface light between telecommunication fibers and optical circuits. They comprise surface emitting elements that diffract guided light out of the plane of the circuit, where it can be collected with standard optical fibers. In contrast to other coupling methods, such as end-face coupling, grating couplers lend themselves to planar fabrication methods and allow free placement of optical interfaces on the chip surface.

Additionally, two-dimensional (2D) gratings allow important multiplexing and de-multiplexing operations, that is, the combination of signals from different optical channels into one channel or the separation of multiple signals in the same channel into individual output channels, respectively. Two-dimensional gratings allow multiplexing in the polarization, wavelength, and spatial domain. For instance, 2D gratings may combine light of two wavelengths from the chip 130 into a single outgoing fiber.

Typically, grating couplers are fabricated by etching the shape of diffractive elements into the waveguide, thus removing material from the waveguide. For one-dimensional (1D) gratings, the diffractive shapes can be as simple as an arrangement of equally-spaced lines, while for two-dimensional gratings, curved lines may be utilized.

Minimizing loss is an important goal of grating coupler design. Before the light can be coupled out by the grating coupler 117E-117H and subsequently collected with optical fibers, light should enter the grating region of the grating couplers 117E-117H with minimal losses. However, differences in the geometry in the waveguides 110 and the grating region lead to losses at this interface, such as reflections and higher-order mode generation, adversely impacting grating performance.

Figure 3:
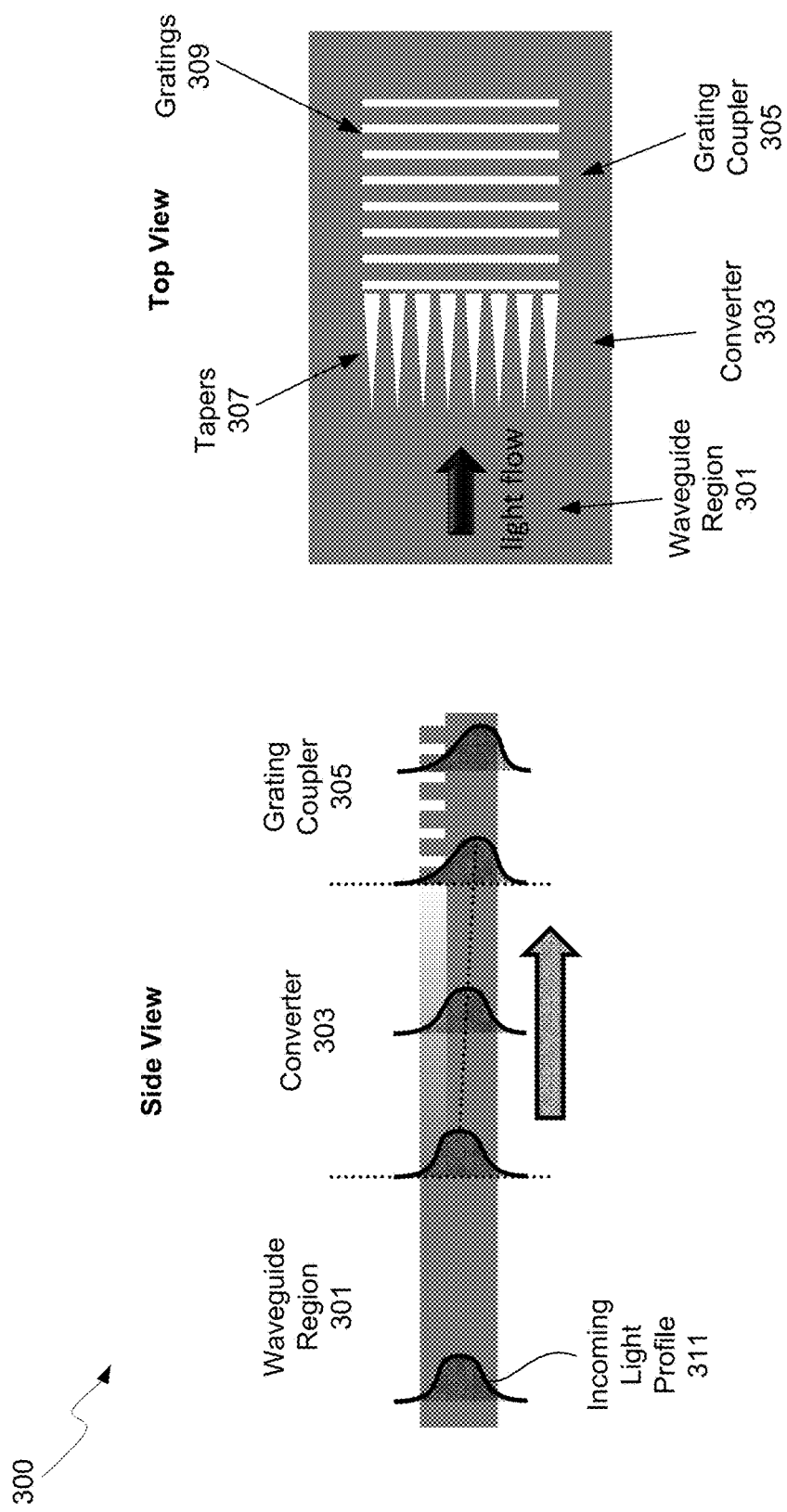
FIG. 3 illustrates top and side views of a grating coupler with adiabatic mode converter, in accordance with an example embodiment of the disclosure.
Figure 4:
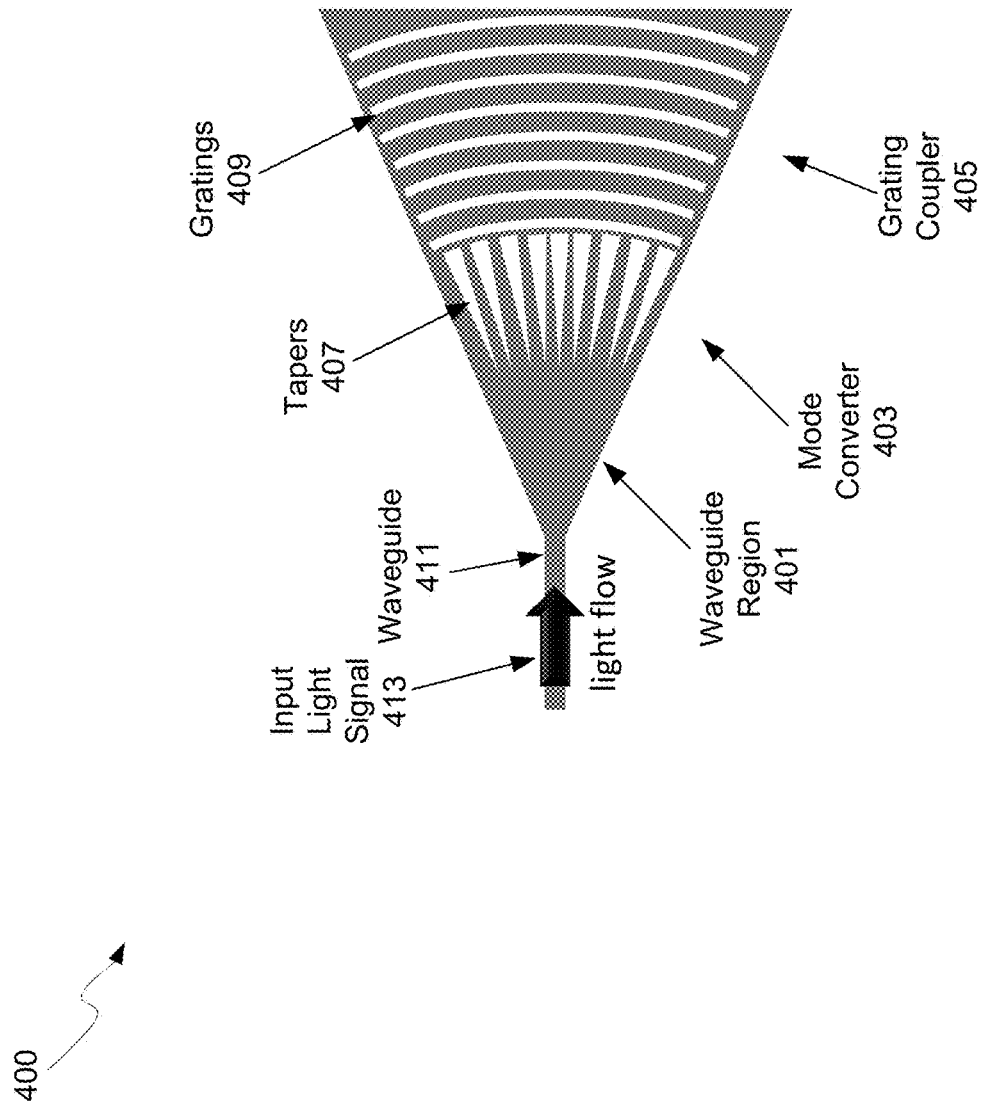
FIG. 4 illustrates a top view of a focusing grating with mode converter tapers, in accordance with an example embodiment of the disclosure.
Figure 5:
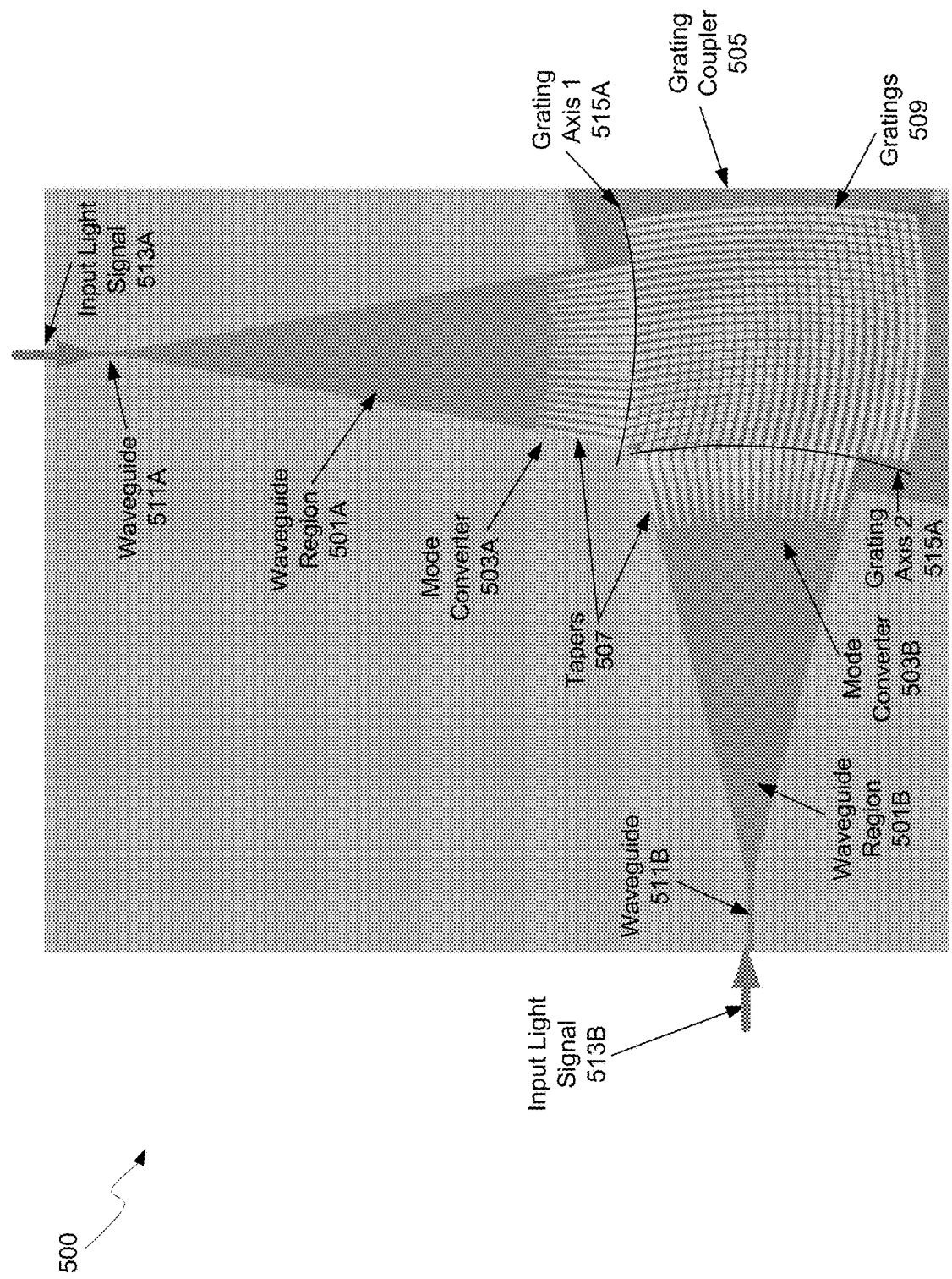
FIG. 5 illustrates a two dimensional focusing grating coupler with mode converters, in accordance with an example embodiment of the disclosure.

In an example embodiment, the grating couplers 117A-117H may have mode converters 121, at the inputs/outputs of the couplers. The mode converters 121 may comprise tapered sections, as shown in FIGS. 3-5, for matching the incoming/outgoing light modes with those of the grating couplers 117A-117H.

The optical fibers may be epoxied, for example, to the CMOS chip, and may be aligned at an angle from normal to the surface of the photonically-enabled integrated circuit 130 to optimize coupling efficiency. In an example embodiment, the optical fibers may comprise single-mode fiber (SMF) and/or polarization-maintaining fiber (PMF).

Figure 1B:
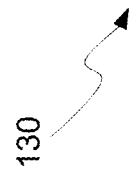
FIG. 1B is a diagram illustrating an exemplary photonically-enabled integrated circuit, in accordance with an example embodiment of the disclosure.
Figure 1B:
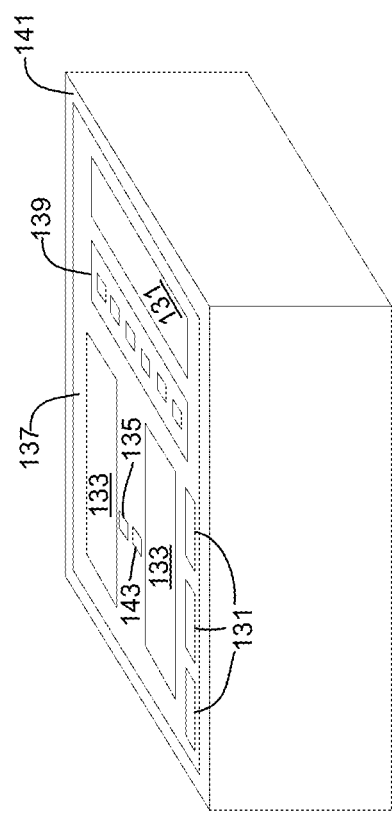

In another exemplary embodiment illustrated in FIG. 1B, optical signals may be communicated directly into the surface of the photonically-enabled integrated circuit 130 without optical fibers by directing a light source on an optical coupling device in the chip, such as the light source interface 135 and/or the optical fiber interface 139. This may be accomplished with directed laser sources and/or optical sources on another chip flip-chip bonded to the photonically-enabled integrated circuit 130.

The photodiodes 111A-111D in FIG. 1A may convert optical signals received from the grating couplers 117A-117D into electrical signals that are communicated to the amplifiers 107A-107D for processing. In an example embodiment of the disclosure, the photodiodes 111A-111D may comprise high-speed heterojunction phototransistors, for example, and may comprise germanium (Ge) in the collector and base regions for absorption in the 1.3-1.6 μm optical wavelength range, and may be integrated on a CMOS silicon-on-insulator (SOI) wafer.

In another example embodiment, the four transceivers shown in FIG. 1A may be incorporated in two or more chips, as opposed to the single chip shown. For example, the electronics devices, such as the control circuits 109 and the amplifiers/TIAs 107A-107D, may be fabricated in an electronics CMOS die while the optical and optoelectronic devices, such as the photodetectors 111A-111D, grating couplers 117A-117H, and the optical modulators 105A-105D may be incorporated on a photonics die, such as a silicon photonics interposer.

The analog and digital control circuits 109 may control gain levels or other parameters in the operation of the amplifiers 107A-107D, which may then communicate electrical signals off the photonically-enabled integrated circuit 130. The control sections 112A-112D comprise electronic circuitry that enable modulation of the CW laser signal received from the splitters 103A-103C. The optical modulators 105A-105D may require high-speed electrical signals to modulate the refractive index in respective branches of a MZM, for example.

In operation, the photonically-enabled integrated circuit 130 may be operable to transmit and/or receive and process optical signals. Optical signals may be received from optical fibers by the grating couplers 117A-117D and converted to electrical signals by the photodetectors 111A-111D. The electrical signals may be amplified by transimpedance amplifiers in the amplifiers 107A-107D, for example, and subsequently communicated to other electronic circuitry, not shown, in the photonically-enabled integrated circuit 130.

Electrical signals, labeled as Electrical Signals In in FIG. 1A, may drive the modulators 105A-105D to modulate the CW optical signals received from the CW laser In 101, resulting in modulated optical signals to be communicated in or out of the chip by the grating couplers 117A-117H, and via the mode converters 121. The mode converters 121 may convert the optical modes to match that of the grating couplers 117A-117H, and are shown further with respect to FIGS. 2-5. The mode converters 121 may be utilized on the outgoing optical signal in the chip 130 and/or incorporated at the optical inputs to the chip 130, namely at the grating couplers 117A-117D.

FIG. 1B is a diagram illustrating an exemplary photonically-enabled integrated circuit, in accordance with an example embodiment of the disclosure. Referring to FIG. 1B, there is shown the photonically-enabled integrated circuit 130 comprising electronic devices/circuits 131, optical and optoelectronic devices 133, a light source interface 135, a chip front surface 137, an optical fiber interface 139, CMOS guard ring 141, and a surface-illuminated monitor photodiode 143.

In an example embodiment, the light source interface 135 and the optical fiber interface 139 comprise grating couplers, for example, that enable coupling of light signals via the CMOS chip surface 137. Coupling light signals via the chip surface 137 enables the use of the CMOS guard ring 141 which protects the chip mechanically and prevents the entry of contaminants via the chip edge.

The electronic devices/circuits 131 comprise circuitry such as the amplifiers 107A-107D and the analog and digital control circuits 109 described with respect to FIG. 1A, for example. The optical and optoelectronic devices 133 comprise devices such as the couplers 103A-103K, optical terminations 115A-115D, grating couplers 117A-117H, optical modulators 105A-105D, high-speed heterojunction photodiodes 111A-111D, and monitor photodiodes 113A-113I.

Figure 1C:
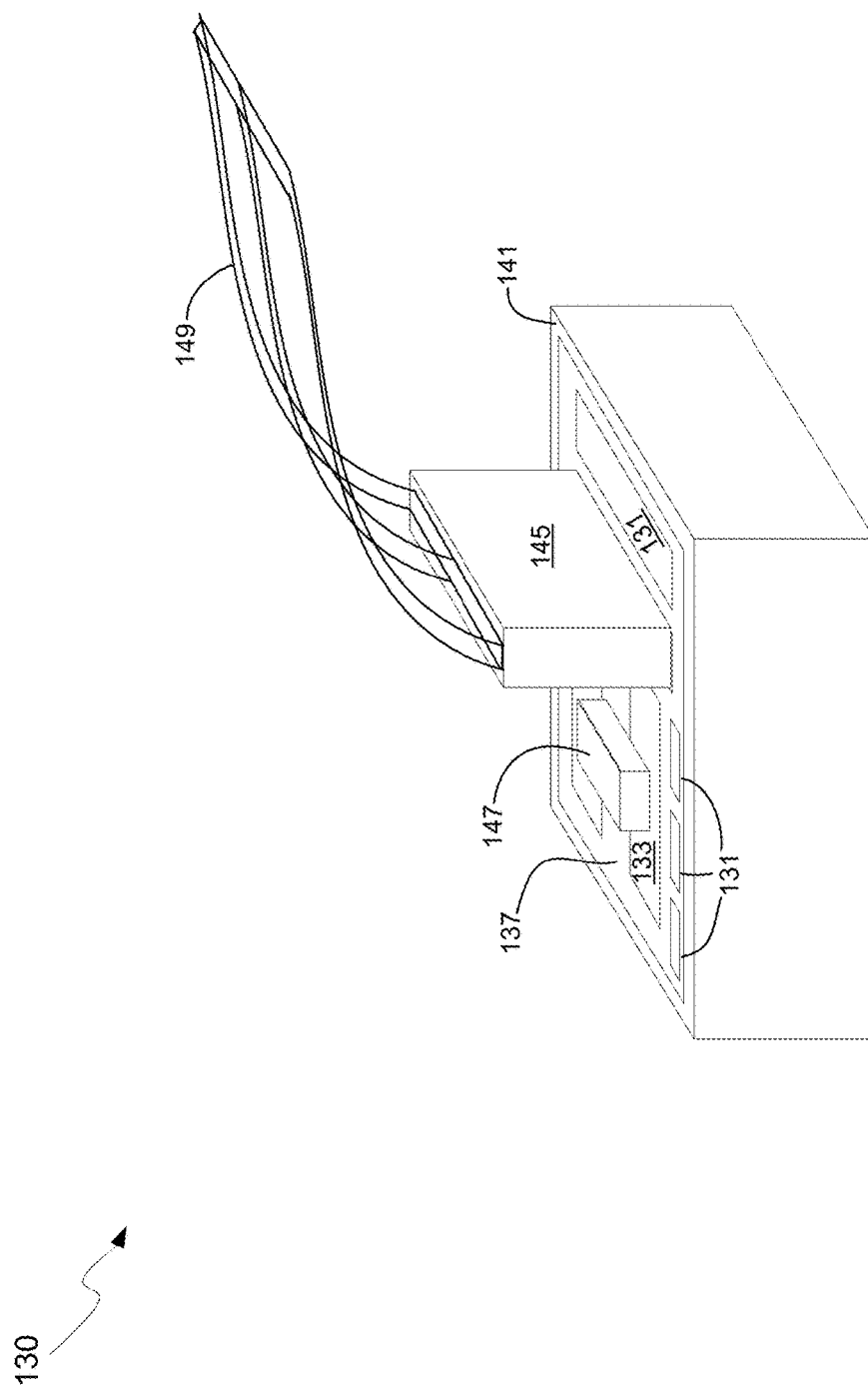
FIG. 1C is a diagram illustrating a photonically-enabled integrated circuit coupled to an optical fiber cable, in accordance with an example embodiment of the disclosure.

FIG. 1C is a diagram illustrating a photonically-enabled integrated circuit coupled to an optical fiber cable, in accordance with an example embodiment of the disclosure. Referring to FIG. 1C, there is shown the photonically-enabled integrated circuit 130 comprising the chip surface 137, and the CMOS guard ring 141. There is also shown a fiber-to-chip coupler 145, an optical fiber cable 149, and an optical source assembly 147.

The photonically-enabled integrated circuit 130 comprises the electronic devices/circuits 131, the optical and optoelectronic devices 133, the light source interface 135, the chip surface 137, and the CMOS guard ring 141 may be as described with respect to FIG. 1B, for example.

In an example embodiment, the optical fiber cable may be affixed, via epoxy for example, to the CMOS chip surface 137. The fiber chip coupler 145 enables the physical coupling of the optical fiber cable 149 to the photonically-enabled integrated circuit 130. In another example scenario, the IC 130 may comprise photonic devices on one die, such as a photonics interposer, and electrical devices on an electronics die, both of which may comprise CMOS die.

Figure 2:
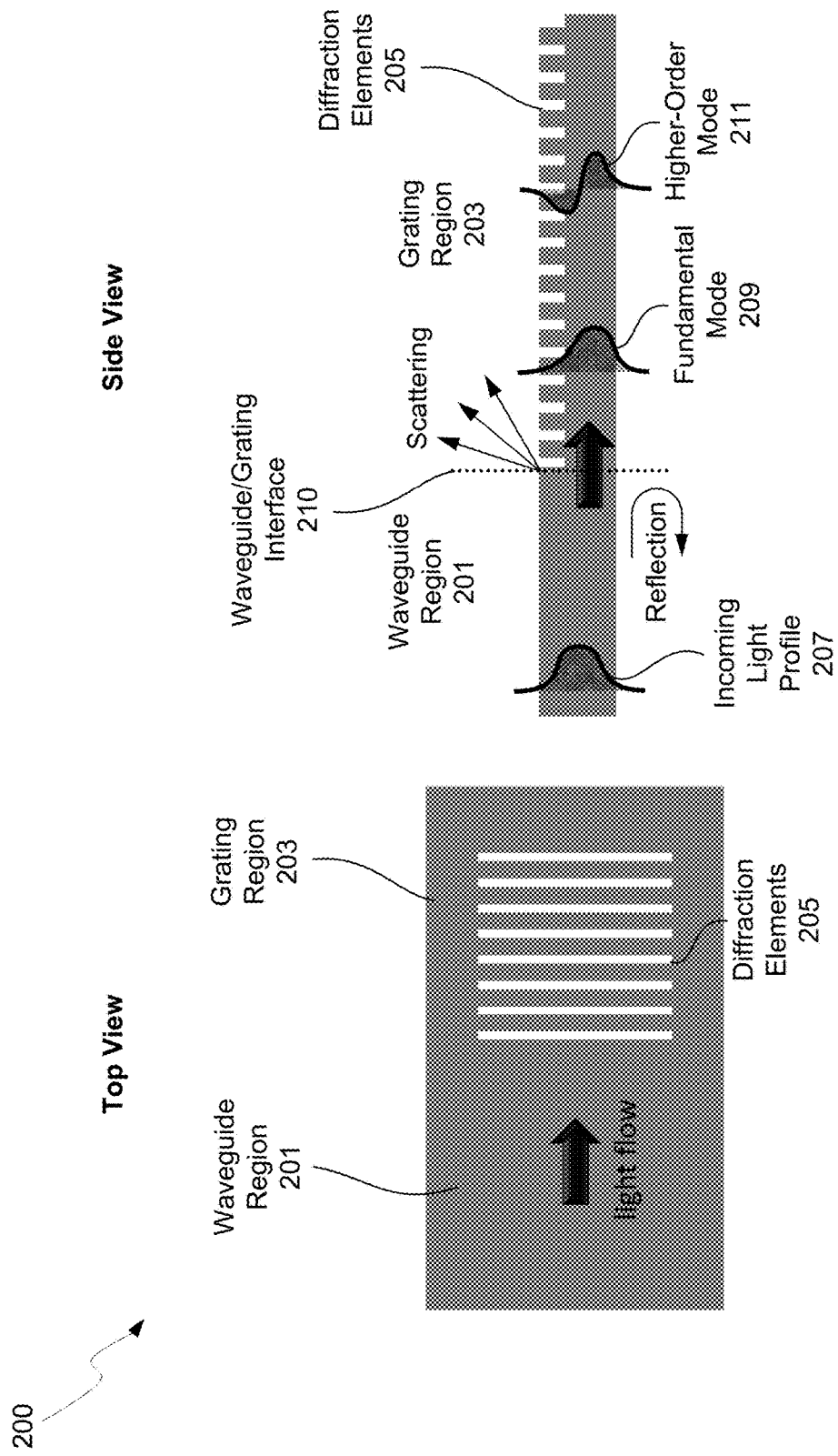
FIG. 2 is a schematic illustrating a one-dimensional grating, in accordance with an example embodiment of the disclosure.

FIG. 2 is a schematic illustrating a one-dimensional grating, in accordance with an example embodiment of the disclosure. Referring to FIG. 2, there is shown a top view and a side view of grating coupler 200 comprising a waveguide region 201 and a grating region 203 comprising an array of linear diffractive elements 205. The diffraction elements 205 may comprise regions where material has been removed from the waveguide material, such as grooves or channels, which in this example comprise essentially straight lines perpendicular the direction of travel of the incoming light signal.

Grating couplers are diffractive structures which may be optimized for a specific light profile propagating at a distinct speed, usually the fundamental mode of the waveguide in the waveguide region 201. To ensure optimum performance of gratings, it is important to allow all incident light to gather into this fundamental mode, where it can be out-coupled and harvested. However, as shown in the side view of the grating coupler 200, several parasitic effects, namely reflection, the conversion to higher-order modes, and scattering out of the structure, occur in the grating region 203 or at the interface 210 between the waveguide region 201 and the grating region 203, which lower the amount of light travelling into this fundamental mode, thus lowering the grating efficiency.

There are two issues that can induce loss at the waveguide-grating interface 210. Firstly, the propagation speed of light may be different in both regions. Due to the removal of high-refractive index material from the waveguide, the propagation speed of light is higher in the grating region 203 than in the waveguide region 201. Secondly, the profile of the fundamental mode 209 in the grating region 203 may be distorted due to the structure of the grating coupler 200. The removed material at the top of the coupler 200 pushes the mode center downwards, breaking the mode symmetry, and changes how the profile decays in the vertical direction.

The differences in mode propagation speed and mode profile induce loss mechanisms at the interface. First, a certain amount of light will be reflected back into the waveguide region 201, where it can interfere with the normal operation of the photonic chip. Second, light may be scattered out of the waveguide, and third, higher order modes, such as higher-order mode 211, can be excited in the grating. Ultimately, only the light in the fundamental mode 209 can be harvested by the grating coupler 200, and any light in the mentioned loss mechanisms is lost.

To avoid losses occurring at this interface, a gradual, or adiabatic, tapered, transition region may be inserted between the waveguide region 201 and the grating region 203. In this transition region, the mode profile and the light propagation speed may be slowly converted, allowing the light to follow the changing geometry, as shown further with respect to FIGS. 3-5, thus significantly reducing losses.

FIG. 3 illustrates top and side views of a grating coupler with adiabatic mode converter, in accordance with an example embodiment of the disclosure. Referring to FIG. 3, there is shown grating coupler with adiabatic mode converter 300, comprising a waveguide region 301, a mode converter 303, and a grating coupler region 305. In this example, the mode converter comprises an array of tapers 307, where a long axis of the tapers 307 is directed parallel to the direction of the incoming light profile 311, and the grating coupler 305 comprises an array of gratings 309, which may comprise regions where material is removed from the waveguide material.

The mode converter 303 comprises a change of material in the top part of the waveguide, such as the removal of silicon material in a silicon waveguide, for example, to a configurable depth, with a configurable width and spacing. In another example scenario, the change in material could instead be on the bottom of the waveguide if the subsequent grating coupler has gratings/corrugations at the bottom. In this manner, the tapers 307 comprise regions where the waveguide material has been removed from the top. A similar effect may be achieved with planar fabrication technology employing planar sub-wavelength structures. When structures are smaller than the wavelength of the light, the propagating light behaves according to the average index of the structure, but not the individual structures.

The top view in FIG. 3 shows mode conversion tapers 307 as one example of such mode conversion structures. The width of the tapers 307 is shorter than the wavelength of the light, thus the light propagates effectively as if it were in a homogeneous medium. However, as the tapers 307 widen, the homogeneous medium gradually approaches the refractive index profile of the grating coupler 305 and the light mode profile transitions to the desired profile for the grating region, as shown by the progression of the mode profile shown in the side view of FIG. 3, where the mode is compressed downward into the waveguide material.

This approach avoids all three parasitic effects otherwise present at a hard waveguide/coupler interface. The mode converter 303 suppresses scattering, reflection, and mode conversion to higher order modes, since there are no hard/waveguide interfaces. The fundamental mode in the grating can therefore be excited with very high efficiency. As a result, all available light may be launched into the grating coupler 305, where it can be coupled out of the top surface of the chip and collected by an optical fiber.

In operation, light from the waveguide region 301 is coupled into the mode converter 303, where the tapers 307 provide mode conversion to avoid the three parasitic effects otherwise present at a hard waveguide/coupler interface. The gratings 309 in the grating coupler 305 scatter the optical mode in a desired direction out of the surface of the mode converting grating coupler 300. The mode converter 303 allows operation in both directions. As such, it may alternatively receive light from grating coupler 305 used for in-coupling of out-of-plane light. The tapers 307 would then spatially relax the mode profile from the grating region to match that of the waveguide region 301, suppressing parasitic effects in a similar fashion. Furthermore, the grating coupler 305 with mode converter 303 can receive optical signals from both directions, i.e., from the grating coupler 305 to be converted in the mode converter 303 to be relaxed to the mode profile needed for the waveguide region 301, and also from the waveguide region 301, mode converted in the mode converter 303 to match that of the grating coupler 305 for coupling out of the grating coupler 305 at near normal angle from the top surface of the die.

FIG. 4 illustrates a top view of a focusing grating with mode converter tapers, in accordance with an example embodiment of the disclosure. Referring to FIG. 4, there is shown mode converting grating coupler 400 comprising a waveguide region 401, a mode converter 403, a focusing grating coupler 405, tapers 407, gratings 409, a waveguide 411, and an input light signal 413.

Focusing grating couplers, such as grating coupler 405, may be employed to couple efficiently to narrow waveguides. Instead of lines, diffractive elements, the gratings 409, may be arranged along elliptical curves, as shown in FIG. 4, to convert the bent light fronts emitted from the narrow waveguide 411 to planar light fronts that may be coupled into an optical fiber. Adiabatic mode converters for such gratings work based on the same principle as the grating coupler 305. The mode converter 403 comprises tapers 407 where the direction of each taper 407, i.e. an axis of each taper 407 is pointed towards the center of waveguide 411. The tapers 407 may be defined by tapered regions where waveguide material is removed. The position of the converter structures follow the first ellipse of the grating.

In operation, input light signal 413 from the waveguide 411 is coupled into the expanding waveguide region 401 and into the mode converter 403, where the tapers 407 provide mode conversion to avoid the three parasitic effects otherwise present at a hard waveguide/coupler interface. The gratings 409 in the grating coupler 405 scatter the optical mode in a desired direction out of the surface of the mode converting grating coupler 400 and may be coupled into an optical fiber.

Operation in the reverse direction, that is from a fiber coupled to the grating coupler 405 and to the waveguide 411, is also within the scope of this disclosure. Accordingly, the grating coupler 405 with mode converter 403 can receive optical signals from both directions, i.e., from the grating coupler to be converted in the mode converter 403 to be relaxed to the mode profile needed for the waveguide region 401 and also from the waveguide region 401, mode converted in the mode converter 403 to match that of the grating coupler 405 for coupling out of the grating coupler 405 at near normal angle from the top surface of the die.

FIG. 5 illustrates a two dimensional focusing grating coupler with mode converters, in accordance with an example embodiment of the disclosure. Referring to FIG. 5, there is shown two-dimensional grating coupler system 500 comprising waveguide regions 501A and 501B, mode converters 503A and 503B comprising tapers 507, two-dimensional grating coupler 505 comprising gratings 509, waveguides 511A and 511B, input light signals 513A and 513B, grating axis 515A, and grating axis 515B.

Two-dimensional gratings are gratings comprised of scattering elements that scatter in more than one direction. For example, two-dimensional gratings can accept light from more than one input direction, as shown in FIG. 5 by the two input light signals 513A and 513B coupled into the structure via the waveguides 511A and 511B and the waveguide regions 501A and 501B that gradually widen from the width of the waveguides 511A and 511B to match the width of the mode converters 503A and 503B. Waveguide 511A provides the input light signal 513A and waveguide 511B provides the input light signal 511B.

In addition to having two inputs, the grating coupler 505 comprises two focusing gratings that focus light in or from more than one narrow waveguide. Instead of lines, diffractive elements, the gratings 509, are arranged along elliptical curves, as shown in FIG. 5, to planarize the light emitted from the narrow waveguides 511A and 511B after out-coupling. Adiabatic mode converters, such as the mode converters 503A and 503B may be employed for such gratings. The mode converters 503A and 503B may comprise modular elements that, once optimized, can be added before the grating, without requiring changes to the grating itself. For two-dimensional gratings, one mode converter per input direction can be used.

The gratings 509 comprise scattering elements arranged along two curved axes, namely the grating axis 515A and grating axis 515B. In this manner, the grating coupler 505 comprises a two-dimensional focusing coupler. The tapers 507 in the mode converters 503A and 503B may be oriented to point towards their respective waveguide 511A and 511B.

The mode converters 503A and 503B mitigate all three parasitic effects otherwise present at a hard waveguide/coupler interface. The mode converters 503A and 503B suppress scattering, reflection, and mode conversion to higher order modes, since there are no hard waveguide/grating interfaces. The fundamental mode in the grating can therefore be excited with very high efficiency. As a result, all available light may be launched into the grating coupler 505, where it can be coupled out of the top surface of the chip and collected by an optical fiber.

Operation in the reverse direction, that is from a fiber coupled to the grating coupler 505 and to the waveguides 511A and 511B, is also within the scope of this disclosure. Accordingly, the grating coupler 505 with mode converters 503A and 503B can receive optical signals from both directions, i.e., from the grating coupler 505 to be converted in the mode converters 503A and 503B to be relaxed to the mode profiles needed for the waveguides 511A and 511B, and also from the waveguides 511A and 511B, mode converted in the mode converters 503A and 503B to match that of the grating coupler 505 for coupling out of the grating coupler 505 at near normal angle from the top surface of the die.

In operation, input light signals 513A and 513B from the waveguides 511A and 511B are coupled into the expanding waveguide regions 501A and 501B and into the mode converters 503A and 503B, where the tapers 507 provide mode conversion to avoid the three parasitic effects otherwise present at a hard waveguide/coupler interface. The gratings 509 in the two-dimensional grating coupler 505 scatter the optical mode in a desired direction out of the surface of the two-dimensional mode converting grating coupler 500 where the light may be coupled into an optical fiber.

Figure 6:
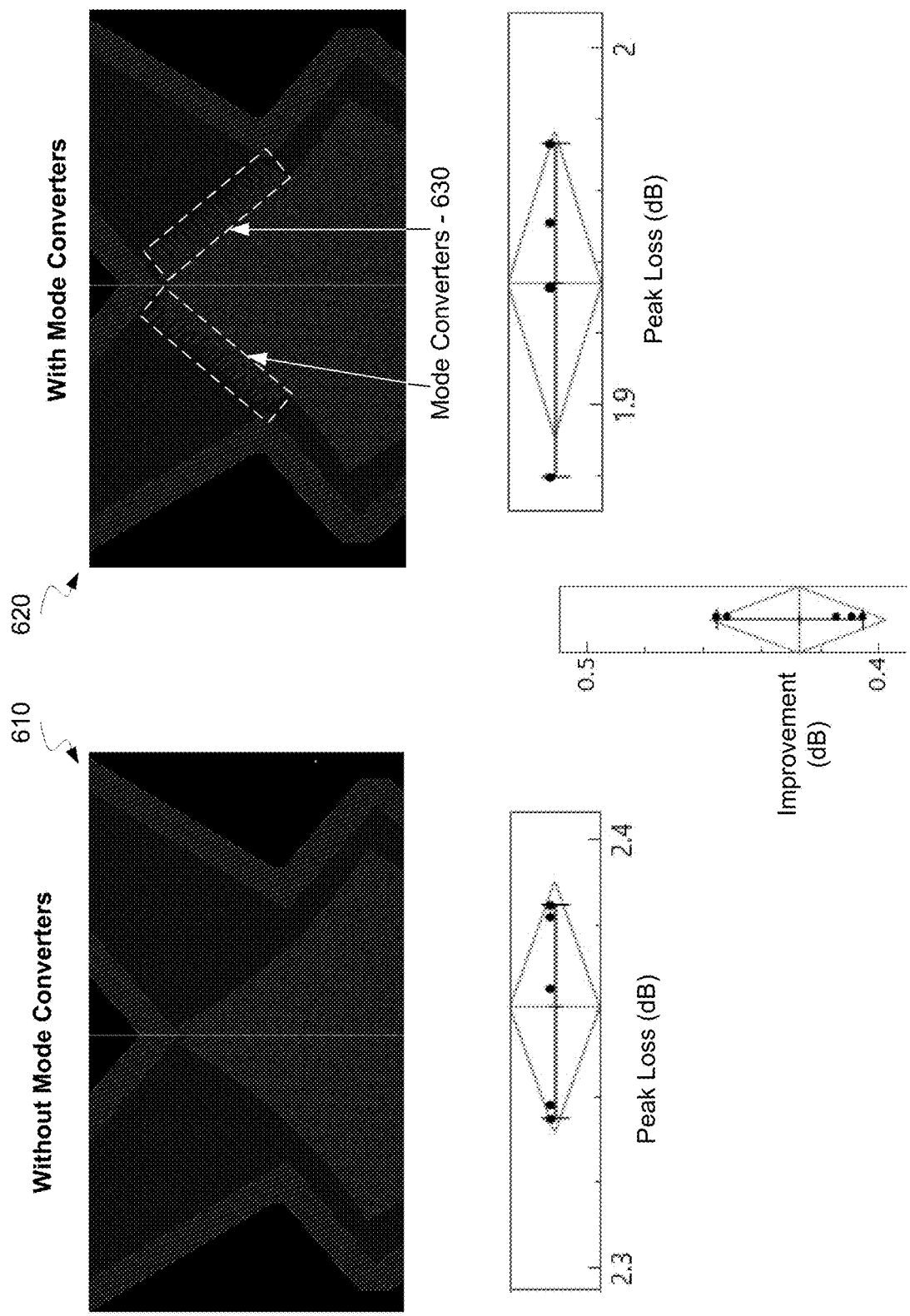
FIG. 6 illustrates experimental results of grating couplers with and without mode converters, in accordance with an example embodiment of the disclosure.

FIG. 6 illustrates experimental results of grating couplers with and without mode converters, in accordance with an example embodiment of the disclosure. Referring to FIG. 6, there is shown a grating coupler 610 without mode converters and grating coupler 620 with mode converters 630. The plots below each grating coupler image show the peak loss of optical signals communicated through grating couplers of each type, and the plot in the center shows the improvement of grating couplers with mode converters compared to grating couplers without mode converters.

As can be seen in the plots below the grating coupler images, the structures without mode converters show losses between 2.32 and 2.39 dB, whereas the structures with mode converters have losses between 1.88 and 1.98 dB resulting in an improvement of 0.4 to 0.46 dB with mode converters, which is in agreement with predictions from simulations.

In an example embodiment of the disclosure, a method and system is described for mode converters for grating couplers and comprise a photonic chip comprising a waveguide, a grating coupler, and a mode converter. The waveguide is coupled to the grating coupler via the mode converter, with the mode converter comprising waveguide material and tapers defined by tapered regions that do not have waveguide material. The photonic chip may be operable to: receive an optical signal in the mode converter from the waveguide, the received optical signal having an incoming light profile; and spatially compress the incoming light profile in the mode converter to configure a desired profile in the grating coupler. The mode converter allows operation in both directions. As such, it may alternatively receive light from grating coupler and spatially relax the mode profile from the grating region to match that of the waveguide region.

A long axis of the tapers may be parallel to a direction of travel of the optical signal in the waveguide. The gratings may be linear. A long axis of the tapers may be directed to a point where the waveguide meets the mode converter. The gratings may be curved. A second waveguide may be coupled to the grating coupler via a second mode converter and the long axis of the tapers may be directed to a point where each waveguide meets its corresponding mode converter. The grating coupler may comprise rows of scattering elements arranged along curved lines.

In another example embodiment, a method and system is described for mode converters for grating couplers and comprise, in a photonic chip comprising a waveguide, a grating coupler, and a mode converter, the waveguide coupled to the grating coupler via the mode converter, the mode converter comprising waveguide material and tapers defining tapered regions without waveguide material: receiving an optical signal in the mode converter from the grating coupler, said received optical signal having an incoming light profile; and spatially relaxing the incoming light profile in the mode converter to configure a desired profile in the waveguide While the present disclosure has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
in a photonic chip comprising a first waveguide, a grating coupler, and a mode converter, the first waveguide coupled to the grating coupler via the mode converter, the mode converter comprising waveguide material and tapers defining tapered regions without waveguide material wherein:
a second waveguide is coupled to the grating coupler via a second mode converter:
the grating coupler comprises rows of scattering elements arranged along curved lines; and
a long axis of the tapers is pointed towards the first waveguide at a point where the tapers meet the curved lines:
receiving an optical signal in the mode converter from the first waveguide, the received optical signal having an incoming light profile; and
spatially compressing the incoming light profile in the mode converter to configure a desired profile in the grating coupler.

2. The method according to claim 1, wherein the long axis of the tapers is parallel to a direction of travel of the optical signal in the first waveguide.

3. The method according to claim 2, wherein gratings in the grating coupler are linear.

4. The method according to claim 1, comprising receiving a second optical signal in the mode converter from the grating coupler, where the second optical signal is spatially relaxed in the mode converter to configure a second desired profile in the first waveguide.

5. The method according to claim 1, wherein the long axis of the tapers is directed to a point where the first waveguide meets the mode converter.

6. The method according to claim 5, wherein gratings of the grating couplers are curved.

7. The method according to claim 6, wherein the long axis of the tapers is pointed towards the first waveguide at a point where each taper meets a first of the gratings.

8. A system for communication, the system comprising:
a photonic chip comprising a first waveguide, a grating coupler, and a mode converter, the first waveguide coupled to the grating coupler via the mode converter, the mode converter comprising waveguide material and tapers defined by tapered regions without waveguide material, wherein:
a second waveguide is coupled to the grating coupler via a second mode converter; and
the grating coupler comprises rows of scattering elements arranged along curved lines and a long axis of the tapers is pointed towards the first waveguide at a point where the tapers meet the curved lines, the photonic chip operable to:
receive an optical signal in the mode converter from the first waveguide, the received optical signal having an incoming light profile; and
spatially deflect the incoming light profile in the mode converter to configure a desired profile in the grating coupler.

9. The system according to claim 8, wherein long axis of the tapers is parallel to a direction of travel of the optical signal in the first waveguide.

10. The system according to claim 9, wherein gratings of the grating couplers are linear.

11. The system according to claim 8, wherein the photonic chip is operable to receive a second optical signal in the mode converter from the grating coupler, where the second optical signal is spatially relaxed in the mode converter to configure a second desired profile in the first waveguide.

12. The system according to claim 8, wherein the long axis of the tapers is directed to a point where the first waveguide meets the mode converter.

13. The system according to claim 12, wherein gratings of the grating couplers are curved.

14. The system according to claim 13, wherein the long axis of the tapers is pointed towards the first waveguide at a point where each taper meets a first of the gratings.

15. A method for communication, the method comprising:
in a photonic chip comprising a first waveguide, a grating coupler, and a mode converter, the first waveguide coupled to the grating coupler via the mode converter, the mode converter comprising waveguide material and tapers defining tapered regions without waveguide material wherein:
a second waveguide is coupled to the grating coupler via a second mode converter:
the grating coupler comprises rows of scattering elements arranged along curved lines; and
a long axis of the tapers is pointed towards the first waveguide at a point where the tapers meet the curved lines:
receiving an optical signal in the mode converter from the grating coupler, the received optical signal having an incoming light profile; and
spatially relaxing the incoming light profile in the mode converter to configure a desired profile in the first waveguide.

16. The method according to claim 15, comprising receiving a second optical signal in the mode converter from the first waveguide, where the second optical signal is spatially compressed in the mode converter to configure a second desired profile in the grating coupler.

17. The method according to claim 16, wherein the long axis of the tapers is directed to a point where the first waveguide meets the mode converter.

18. The method according to claim 17, wherein gratings of the grating coupler are curved.

19. The method according to claim 18, wherein the long axis of the tapers is pointed towards the first waveguide at a point where each taper meets a first of the gratings.

* * * * *

UNITED STATES PATENT AND TRADEMARK OFFICE
CERTIFICATE OF CORRECTION

PATENT NO. : 10,782,479 B2
APPLICATION NO. : 15/945370
DATED : September 22, 2020
INVENTOR(S) : Roman Bruck et al.

Page 1 of 1

It is certified that error appears in the above-identified patent and that said Letters Patent is hereby corrected as shown below:

On the Title Page

On the page 2, item (60), in Column 1, in "Related U.S. Application Data", Lines 7-8, delete "Apr. 16, 2017." and insert -- Apr. 19, 2017. --, therefor.

In the Specification

In Column 2, Line 19, delete "and or" and insert -- and/or --, therefor.

In Column 10, Line 33, delete "waveguide" and insert -- waveguide. --, therefor.

In the Claims

In Column 10, Line 56, in Claim 1, delete "converter:" and insert -- converter; --, therefor.

In Column 11, Line 39, in Claim 9, after "wherein" insert -- the --.

In Column 11, Line 43, in Claim 10, delete "couplers" and insert -- coupler --, therefor.

In Column 12, Line 20, in Claim 15, delete "converter:" and insert -- converter; --, therefor.

Signed and Sealed this
Seventeenth Day of November, 2020

Andrei Iancu
*Director of the United States Patent and Trademark Office*